(12) United States Patent
Narita

(10) Patent No.: US 9,371,398 B2
(45) Date of Patent: Jun. 21, 2016

(54) METHODS FOR PREPARING ALKALI CELLULOSE AND CELLULOSE ETHER

(75) Inventor: Mitsuo Narita, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 657 days.

(21) Appl. No.: 13/398,273

(22) Filed: Feb. 16, 2012

(65) Prior Publication Data

US 2012/0214980 A1 Aug. 23, 2012

(30) Foreign Application Priority Data

Feb. 21, 2011 (JP) ................................ 2011-034468

(51) Int. Cl.
| | | |
|---|---|---|
| C08B 1/08 | (2006.01) | |
| C08B 1/06 | (2006.01) | |
| C08B 11/02 | (2006.01) | |
| C08B 11/193 | (2006.01) | |
| C08B 1/10 | (2006.01) | |
| C08B 11/00 | (2006.01) | |

(52) U.S. Cl.
CPC ... C08B 1/08 (2013.01); C08B 1/10 (2013.01); C08B 11/00 (2013.01); C08B 11/193 (2013.01)

(58) Field of Classification Search
CPC .............. C08B 1/08; C08B 1/06; C08B 11/02
USPC ............................................ 536/124, 61, 85
See application file for complete search history.

(56) References Cited

U.S. PATENT DOCUMENTS

| | | | |
|---|---|---|---|
| 2,054,299 A | 9/1936 | Richter | |
| 2,138,014 A | 11/1938 | Richter | |
| 2,469,764 A | 5/1949 | Erickson | |
| 3,943,233 A * | 3/1976 | Swanson et al. | ............... 423/332 |
| 4,117,223 A | 9/1978 | Lodige et al. | |
| 4,310,663 A | 1/1982 | Hilbig et al. | |
| 4,316,982 A | 2/1982 | Holst et al. | |
| 4,363,784 A | 12/1982 | Hilbig et al. | |
| 4,410,693 A | 10/1983 | Gibson et al. | |
| 4,508,895 A | 4/1985 | Balser | |
| 4,612,345 A | 9/1986 | Hess | |
| 8,017,766 B2 | 9/2011 | Narita et al. | |
| 8,496,782 B2 | 7/2013 | Narita | |
| 2007/0144692 A1 | 6/2007 | Narita et al. | |
| 2007/0149771 A1 | 6/2007 | Narita et al. | |
| 2007/0149772 A1 | 6/2007 | Narita et al. | |
| 2007/0149773 A1 | 6/2007 | Narita et al. | |
| 2007/0149774 A1 | 6/2007 | Narita et al. | |
| 2008/0003429 A1 | 1/2008 | Luo et al. | |
| 2009/0071377 A1 | 3/2009 | Wohrmeyer et al. | |
| 2009/0165971 A1 | 7/2009 | Narita | |
| 2009/0165972 A1 | 7/2009 | Narita | |

FOREIGN PATENT DOCUMENTS

| | | |
|---|---|---|
| CN | 1990507 A | 7/2007 |
| CN | 101096431 A | 1/2008 |
| EP | 1 734 055 A2 | 12/2006 |
| EP | 1 803 736 A1 | 7/2007 |
| EP | 1 803 737 A1 | 7/2007 |
| EP | 1 803 738 A1 | 7/2007 |
| EP | 1 803 739 A1 | 7/2007 |
| EP | 1 873 302 A2 | 1/2008 |
| EP | 1 878 752 A1 | 1/2008 |
| JP | 12 6608 B | 6/1938 |
| JP | 126608 | 6/1938 |
| JP | 35-8347 B | 7/1960 |
| JP | 36-17641 B | 9/1961 |
| JP | 47-003964 B | 2/1972 |
| JP | 47-003965 B | 2/1972 |
| JP | 48-019232 B | 6/1973 |
| JP | 48-026385 B | 8/1973 |
| JP | 53-041356 A | 4/1978 |
| JP | 55-145701 A | 11/1980 |
| JP | 56-002302 A | 1/1981 |
| JP | 3073562 B | 11/1983 |
| JP | 59-056401 A | 3/1984 |
| JP | 60 040101 A | 3/1985 |
| JP | 61-264001 A | 11/1986 |
| JP | 64-085201 A | 3/1989 |
| JP | 10-158302 A | 6/1998 |
| JP | 10-279601 A | 10/1998 |
| JP | 2000-506215 A | 5/2000 |
| JP | 2001-002701 A | 1/2001 |

(Continued)

OTHER PUBLICATIONS

Michie, R.I.C., et al.; Kinetic Study of the Autoxidation of Cellulose Suspended in Sodium Hydroxide Solution; Journal of Polymer Science; Part A; vol. 2; 1964; pp. 2063-2083.
Partial Translation of "Cellulose No Jiten (Encyclopedia of Cellulose)", edited by the Cellulose Society of Japan and published on Nov. 10, 2000, 3 pages.
European Search Report for Application No. 12156044.5 dated Jun. 26, 2012.
European Search Report for Application No. 12156043.7 dated Jun. 22, 2012.
European Search Report for Application No. 12156045.2 dated Jun. 18, 2012.
Extended European Search Report from European Application No. 12156046.0, dated Jun. 8, 2012.

(Continued)

*Primary Examiner* — Scarlett Goon
*Assistant Examiner* — Everett White
(74) *Attorney, Agent, or Firm* — Alston & Bird LLP

(57) ABSTRACT

Provided is a method for efficiently preparing alkali cellulose having a uniform alkali distribution. More specifically, provided are a methods for preparing alkali cellulose comprising a contact filtration step of bringing a pulp into contact with an alkali metal hydroxide solution on a moving filtration plane for vacuum filtration to collect a contact product remaining on the filtration plane, and a draining step of draining the contact product; and a method of preparing cellulose ether by using the alkali cellulose. Also provided is an apparatus for preparing alkali cellulose comprising a continuous horizontal vacuum filter type contactor.

11 Claims, 2 Drawing Sheets

(56) References Cited

FOREIGN PATENT DOCUMENTS

| | | | |
|---|---|---|---|
| JP | 2001-302701 A | 10/2001 | |
| JP | 2003-171401 A | 6/2003 | |
| JP | 2003-183301 A | 7/2003 | |
| JP | 2005-008827 A | 1/2005 | |
| JP | 2005-239845 A | 9/2005 | |
| JP | 2006-348177 A | 12/2006 | |
| JP | 2007-197677 A | 8/2007 | |
| JP | 2007-197678 A | 8/2007 | |
| JP | 2007-197679 A | 8/2007 | |
| JP | 2007-197680 A | 8/2007 | |
| JP | 2007-197681 A | 8/2007 | |
| JP | 2007-197682 A | 8/2007 | |
| JP | 4087534 B2 | 2/2008 | |
| JP | 2009-155534 A | 7/2009 | |
| JP | 2009-173907 A | 8/2009 | |
| JP | 2009-528972 A | 8/2009 | |
| WO | WO 97/33918 A1 | 9/1997 | |
| WO | WO 2007/023513 A1 | 3/2007 | |

OTHER PUBLICATIONS

Extended Search Report for Application No. EP 12 15 6041.1 dated Jun. 29, 2012.
Office Action for Chinese Application No. 201210038976.9 dated Dec. 4, 2013.
Office Action for Japanese Application No. 2011-034469 dated May 8, 2013.
Office Action for Japanese Application No. 2011-034471 dated May 8, 2013.
Office Action from Japanese Application No. 2011-034472, dated Jul. 8, 2014.
Office Action from Japanese Application No. 2011-034468, dated Jul. 8, 2014.
Office Action from U.S. Appl. No. 13/398,247 dated Sep. 4, 2014.
Office Action from U.S. Appl. No. 13/398,317 dated Aug. 28, 2014.
Office Action from U.S. Appl. No. 13/398,369 dated Aug. 28, 2014.
Office Action from U.S. Appl. No. 13/398,393 dated Sep. 11, 2014.
Office Action for Japanese Application No. 2012-034021 dated Oct. 21, 2014.
Office Action for U.S. Appl. No. 13/398,247 dated Mar. 24, 2015.
Notice of Allowance for U.S. Appl. No. 13/398,317 dated Apr. 23, 2015.
Office Action for U.S. Appl. No. 13/398,369 dated Apr. 23, 2015.
Office Action for U.S. Appl. No. 13/398,393 dated Apr. 23, 2015.

* cited by examiner

METHODS FOR PREPARING ALKALI CELLULOSE AND CELLULOSE ETHER

BACKGROUND OF THE INVENTION

1. Field of the Invention

The present invention relates to a method for preparing alkali cellulose and a method for preparing cellulose ether by using the alkali cellulose thus obtained.

2. Description of the Related Art

For the preparation of cellulose ether, known is a method of bringing an alkali solution into contact with a highly purified pulp to prepare the corresponding alkali cellulose, and etherifying the resulting alkali cellulose with an etherifying agent. The cellulose ether obtained as a final product becomes water-soluble by properly controlling its degree of substitution. The water-soluble cellulose ether contains a water-insoluble portion which sometimes lowers the light transmittance of the aqueous solution of the cellulose ether or damages the commodity value of the cellulose ether as a contaminant. This insoluble portion appears to be caused by the presence of a low-substituted portion which does not have enough substituents to dissolve in water. One of the reasons why the insoluble portion is present is that an alkali distribution is uneven in the alkali cellulose.

Functions of this alkali include swelling the cellulose therewith to change its crystal structure in the pulp and thereby promoting the penetration of the etherifying agent; catalyzing the etherification reaction with an alkylene oxide; and serving as a reactant for an alkyl halide. A portion of pulp not brought into contact with the aqueous alkali solution is not involved in the reaction and therefore remains as an undissolved portion. Lack of uniformity of the alkali cellulose directly leads to the undissolved portion.

A widely used method for preparing alkali cellulose includes a method comprising the steps of adding an alkali to a powdery pulp, which has been obtained by pulverizing a pulp, in an amount just necessary for the etherification reaction, and mechanically mixing them (Japanese Patent Application Examined Publication No. 60-050801/1985 and Japanese Patent Application Unexamined Publication No. 56-002302/1981). In this method, however, the alkali is not distributed uniformly in the pulp. The pulp not brought into contact with the alkali fails to become cellulose ether and remains in the final product as an unreacted portion, thereby lowering the quality of the cellulose ether.

In order to prevent such a problem, as described in Japanese Patent Application Unexamined Publication No. 60-040101/1985, proposed is a method comprising the steps of immersing a pulp sheet in an excess alkali solution to allow the pulp to absorb the alkali sufficiently and then pressing the resulting pulp under pressure to remove an excess alkali over the intended amount of alkali. When this method is industrially applied, it is typical to pass a supporting shaft through a center tube of pulp wound into a roll form, and elevate the rolled pulp, thereby lifting it up from a floor surface, or place the pulp wound into a roll form on a skid, to allow the pulp to rotate freely; and introduce the pulp into an immersion tank while unwinding the pulp into the pulp sheet. In this method, however, it sometimes becomes impossible to continue an operation because the pulp sheet is pulled and broken during immersion. In addition, mass production requires a very large immersion tank for immersing the pulp sheet therein for a certain time, which is disadvantageous because a sufficient space for installing such a tank cannot be secured easily or an investment cost becomes large. On the other hand, when the pulp is in chip form, pressing becomes uneven because of lack of flat surfaces in the obtained cake so that the alkali distribution in the alkali cellulose becomes uneven, leading to quality deterioration.

On the other hand, in page 433 of "Cellulose No Jiten (Encyclopedia of Cellulose)" edited by the Cellulose Society of Japan and published on Nov. 10, 2000, described is a method for preparing alkali cellulose with respect to viscose preparation, the method comprising the steps of adding a pulp to an alkali solution to form a gruel-like slurry and pressing the slurry by a slurry press. Although some problems caused by use of pulp sheet can be solved, the slurry press causes uneven pressing so that an alkali distribution in the alkali cellulose becomes uneven, leading to the lowered quality. In addition, alkali cellulose having relatively small alkali content, which is required as a raw material of cellulose ether, is difficult to be prepared by this method alone because of limitation in the pressing performance. Thus, it is difficult to apply this method to the preparation of cellulose ether.

In Japanese Patent Application Examined Publication No. 03-073562/1991, described is a method for preparing cellulose ether having a desired composition, comprising the steps of preparing alkali cellulose from cellulose and excess alkali, and washing the alkali cellulose with a hydrophilic solvent to remove the alkali. However, this method requires large scale equipment and many steps. In addition, the hydrophilic solvent remains in the alkali cellulose and causes a side reaction with an etherifying agent so that efficiency of the reaction with the etherifying agent decreases. Further, this method requires neutralization of the washing liquid or recovery of the alkali so that it is not suited for the industrial production of cellulose ether.

SUMMARY OF THE INVENTION

The present invention provides a method for efficiently preparing alkali cellulose having a uniform alkali distribution.

In one aspect of the present invention, there is thus provided a method for preparing alkali cellulose, comprising a contact filtration step of bringing a pulp into contact with an alkali metal hydroxide solution on a moving filtration plane for vacuum filtration to collect a contact product remaining on the filtration surface; and a draining step of draining the contact product. In another aspect of the invention, there is also provided a method for preparing cellulose ether comprising a step of reacting this alkali cellulose with an etherification agent. In a further aspect of the present invention, there is also provided an apparatus for preparing alkali cellulose, comprising a continuous horizontal vacuum filter type contactor comprising a horizontal filtration plane moving in a horizontal direction, a pulp inlet for introducing pulp onto the moving filtration plane, a spray port for spraying an alkali metal hydroxide solution to the pulp thus introduced, a vacuum pump enabling vacuum suction of the moving filtration plane, and an outlet for collecting a contact product remaining on the filtration plane after bringing the pulp into contact with the alkali metal hydroxide solution on the moving filtration plane for vacuum filtration; and a drainer for draining the contact product thus collected from the outlet to obtain a cake.

According to the present invention, alkali cellulose having an alkali distributed uniformly therein can be prepared efficiently by minimizing the pulp which has failed to be brought into contact with an alkali metal hydroxide solution and has therefore not been wetted with the alkali metal hydroxide solution due to the tendency of pulp to float in the alkali metal hydroxide solution. As a result, cellulose ether with high transparency can be prepared efficiently.

DETAILED DESCRIPTION OF THE PREFERRED EMBODIMENTS

Figure 1:
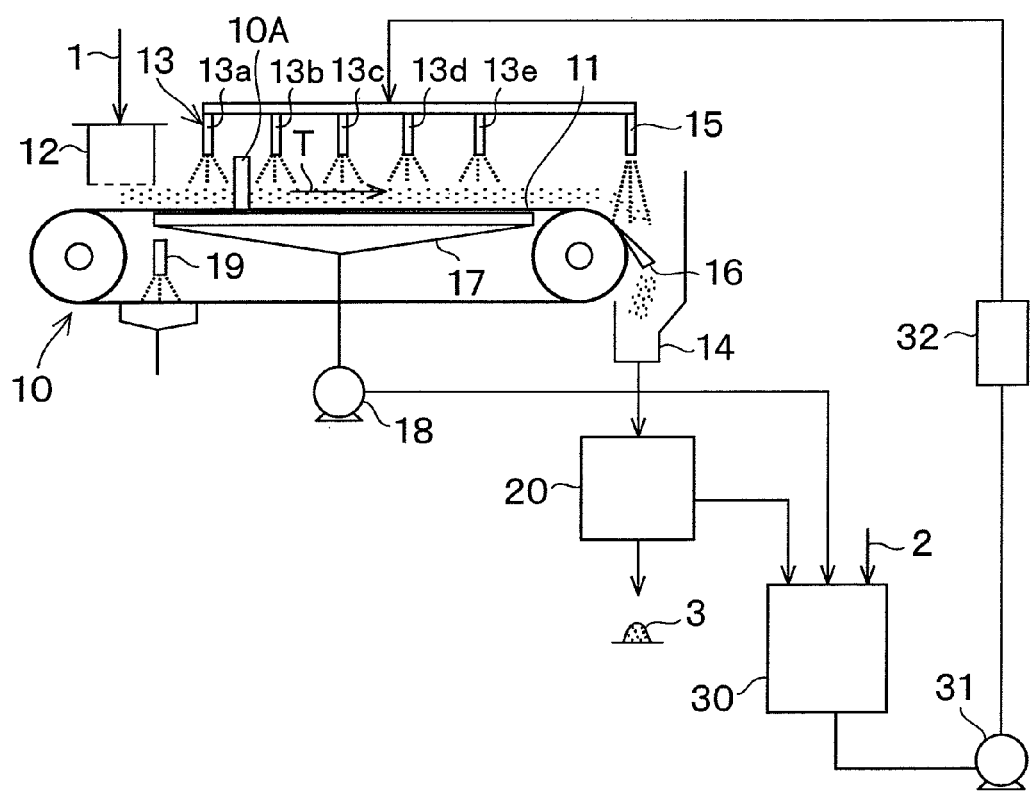
FIG. 1 shows an example of an apparatus for preparing alkali cellulose.

The pulp to be used in the invention may include wood pulp and cotton linter pulp. The wood may include needle-leaf trees such as pine, spruce and hemlock, and broad-leaf trees such as eucalyptus and maple. The pulp to be used in the invention can be in powder or chip form.

The powdery pulp is available by pulverizing a pulp sheet and is in powder form. A powdery pulp having an average particle size of from 10 to 1,000 μm is typically used, but the powder pulp is not limited thereto. The method for preparing the powdery pulp is not limited. For example, a pulverizer such as knife mill and hammer mill can be used.

The method for preparing pulp chips is not limited. For example, they can be obtained by cutting a pulp sheet with an existing cutting device such as a slitter cutter. The cutting device which can perform continuous cutting is advantageous from the standpoint of cost.

The plane face area of the chip is preferably from 4 to 10,000 mm$^2$, more preferably from 10 to 2,500 mm$^2$. Each chip having a plane face area smaller than 4 mm$^2$ may be difficult to be prepared, while each chip having a plane face area greater than 10,000 mm$^2$ may be difficult to be handled, for example, when it is introduced into a continuous horizontal vacuum filter type contactor and/or into a drainer. The term "plane face area of the chip" as used herein means the largest face area of six face areas of the hexahedral chip, supposing that each pulp chip has a hexahedral shape.

The alkali metal hydroxide solution to be used in the invention is not particularly limited insofar as it can produce alkali cellulose. It is preferably an aqueous solution of sodium hydroxide or potassium hydroxide, particularly preferably an aqueous solution of sodium hydroxide from the economic viewpoint. As a solvent for dissolving the alkali hydroxide therein, water is typically employed, but a lower alcohol (preferably an alcohol having from 1 to 4 carbon atoms) or another inert solvent, or a combination of them may be used.

The concentration of the alkali metal hydroxide solution is preferably from 23 to 60% by weight, more preferably from 35 to 55% by weight. Concentrations less than 23% by weight may be economically disadvantageous since in a subsequent step for obtaining cellulose ether, a side reaction between an etherifying agent and water occurs. In addition, cellulose ether having a desired degree of substitution may not be obtained and an aqueous cellulose ether solution thus prepared may be inferior in transparency. On the other hand, concentrations exceeding 60% by weight may make it difficult to handle the solution because of an increase in its viscosity. It is noted that the concentration of the alkali metal hydroxide solution to be provided for contact with the pulp is preferably kept constant in order to stabilize the composition of the alkali cellulose and ensure transparency of the cellulose ether.

According to the invention, in the contact filtration step, for example, a continuous horizontal vacuum filter type contactor can be used. The continuous horizontal vacuum filter type contactor is not limited insofar as it can move a horizontal filtration plane and continuously repeat vacuum filtration and collection of a contact product remaining on the filtration plane by actuating a valve or the like. The shape of the contactor may preferably include a table, a belt and a multiple-pan.

FIG. 1 shows an example of the apparatus for preparing alkali cellulose comprising a continuous horizontal vacuum filter type contactor 10 and a drainer 20 for draining the contact product prepared in the continuous horizontal vacuum filter type contactor.

The continuous horizontal vacuum filter type contactor 10 comprises a filtration plane 11, an inlet 12 of pulp 1 at one end of the contactor, and a group of spray ports 13 for spraying an alkali metal hydroxide solution 2. The alkali metal hydroxide solution to be sprayed is controlled to a predetermined temperature by a heat exchanger 32. The pulp introduced from the inlet is brought into contact with the alkali metal hydroxide solution sprayed from the group of the alkali metal hydroxide solution spray ports 13 equipped with alkali metal hydroxide solution spray ports 13a to 13e, while being vacuum-filtered and being moved in a transfer direction T to the other end.

The pulp introduced from the inlet or the contact product between the introduced pulp and the alkali metal hydroxide solution can be leveled by a leveling device 10A. A plurality of leveling devices may be placed in a moving direction and the number of them is preferably 2 or greater. The leveling device which can adjust a height level is preferable. The height "h" corresponding to the deposition thickness of the contact product between the pulp and the alkali metal hydroxide solution is preferably 200 mm or less, more preferably 100 mm or less.

Figure 2:
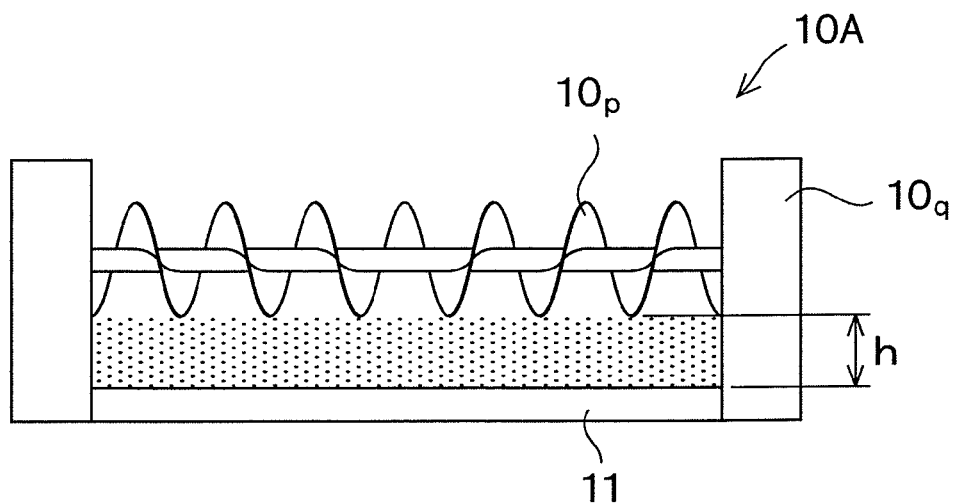
FIG. 2 shows an example of a screw-type leveling device viewed from the width direction of the filtration plane.

As the leveling device, any of plate type, notch type (serrate type), comb type, screw type (refer to FIG. 2) or blade type (refer to FIG. 3) device may be used. FIG. 2 shows, as an example of the screw type leveling device, a leveling device 10A comprising a screw $10_p$ and a support $10_q$, viewed from the width direction (direction perpendicular to the moving direction T of pulp) of the filtration plane 11. The screw type device has preferably a function of gathering the pulp or the pulp and the alkali metal hydroxide solution to the middle from both sides. FIG. 2 shows a bilaterally symmetrical screw $10_p$ having a plane of symmetry at the middle and capable of gathering the pulp and the like to the middle from both sides.

Figure 3:
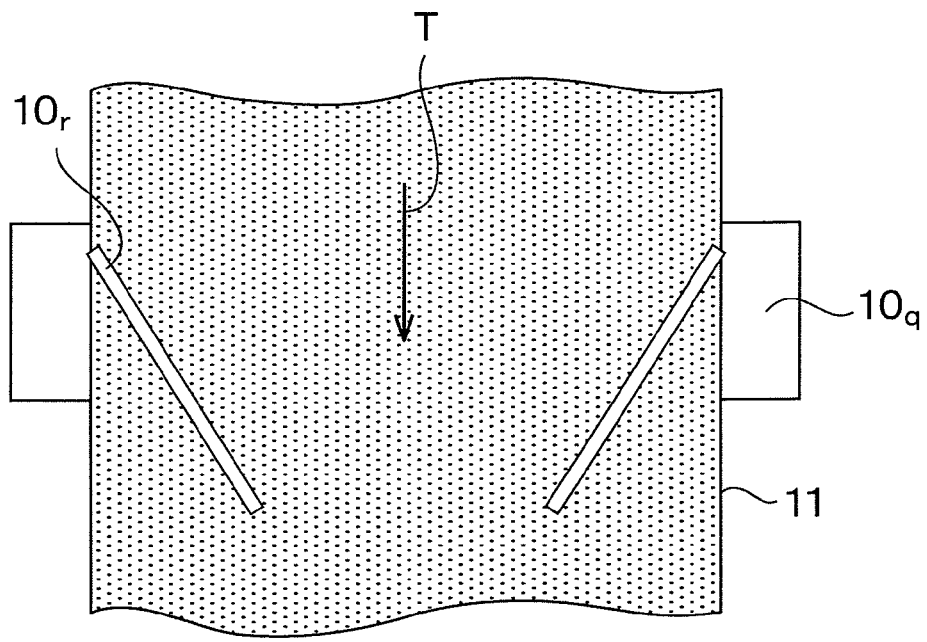
FIG. 3 shows an example of a blade type leveling device viewed from above.

FIG. 3 shows, as an example of the blade type leveling device, a leveling device 10A comprising a blade $10_r$ instead of the screw $10_p$, viewed from above the filtration plane 11. The blade type leveling device has preferably a function of gathering the pulp or the pulp and the alkali metal hydroxide solution to the middle from both sides. In the device shown in FIG. 3, in order to gather the pulp or the pulp and the alkali metal hydroxide solution from both sides to a middle direction, the blade has an angle exceeding 0° but less than 90°, keeping the middle part of the width of the filtration plane 11 open, wherein the angle of the moving direction T of the pulp is 0° and the angle of a width direction of the filtration plane 11 is 90°. A portion of the pulp tends to move toward both sides due to a spraying pressure when the alkali metal hydroxide solution 2 is sprayed from the group of spray ports 13 so that the function of gathering the pulp and the like to the middle from both sides is preferred to offset this tendency. It is to be noted that the contact product between the pulp and the alkali metal hydroxide solution is preferably mixed by the leveling device.

The continuous horizontal vacuum filter type contactor which can replace an atmosphere by vacuum or nitrogen is more preferable from the standpoint of preventing decrease in the polymerization degree of the alkali cellulose in the presence of oxygen. At the same time, when control of the polymerization degree in the presence of oxygen is intended, the contactor having a structure which can adjust an oxygen amount is preferred.

For example, a continuous horizontal vacuum filter type contactor to be used in the invention is preferably capable of freely controlling the temperature of the alkali metal hydroxide solution or the contact time. It is because in order to obtain alkali cellulose having a desired composition, the composition of the alkali cellulose depends on the amount of the alkali metal hydroxide solution absorbed by the pulp and the absorption amount can be adjusted by controlling the contact time or the temperature of the alkali solution.

The temperature of the alkali metal hydroxide solution can be controlled by the known art. It is preferable to us a heat exchanger. The temperature of the alkali metal hydroxide solution is not particularly limited. It is controlled preferably within a range of from 15 to 80° C.

In the invention, the contact time is controlled preferably by changing the moving speed of the filtration plane or contact distance of the alkali metal hydroxide solution. The term "contact distance" as used herein means a distance through which the pulp and the alkali metal hydroxide solution moved while being brought into contact. In many cases, it can be adjusted by changing the spray position of the alkali metal hydroxide solution at which the pulp supplied onto the filtration plane is brought into first contact with the alkali metal hydroxide solution.

The moving speed of the filtration plane is preferably from 0.0005 to 10 m/s, more preferably from 0.005 to 5 m/s. When the moving speed is less than 0.0005 m/s, the amount of the pulp per filtration area may become excessive and uniform contact may not be expected. When the moving speed is more than 10 m/s, excessively large equipment may be necessary, which may be impractical. The contact distance between the pulp and the alkali metal hydroxide solution is preferably from 0.5 to 100 m, more preferably from 1 to 50 m. The contact distance less than 0.5 m may make it difficult to control the absorption amount. The contact distance exceeding 100 m may be impractical because it may require excessively large equipment.

The contact time between the pulp and the alkali metal hydroxide solution is preferably in a range of from 1 second to 15 minutes, more preferably from 2 seconds to 2 minutes. When the contact time is less than one second, the control of the absorption amount may be difficult. When the contact time is more than 15 minutes, excessively large equipment may be required, or the productivity may be lowered, and moreover the alkali absorption amount of the pulp may increase excessively. Accordingly, it may be difficult to obtain alkali cellulose having a desired composition suited for the preparation of cellulose ether whatever drainer is employed. From the viewpoint of a satisfactory quality, the pulp supplied to the filtration plane should not pass without being brought into contact with the alkali metal hydroxide solution. In contact filtration, it is therefore preferable to move the pulp in such a manner that the pulp can be brought into contact with the alkali metal hydroxide solution completely. It is preferable to provide a plurality of spray positions of the alkali metal hydroxide solution in a moving direction. More specifically, two or more spray positions are preferably provided in a moving direction. Typically, about 50 spray positions per meter in a moving direction are preferable.

The spraying apparatus preferably comprises a plurality of nozzles on a line extending in a direction crossing the moving direction, the nozzle including a spray nozzle, a pipe-shaped nozzle, and a pipe with a plurality of holes made therein.

In the invention, a ratio of the volume of the alkali metal hydroxide solution to be sprayed to the weight of the pulp is preferably 0.1 L/kg or greater, more preferably 3.0 L/kg or greater, still more preferably 5.0 L/kg or greater, particularly preferably 10.0 L/kg or greater per spray port. When the ratio is less than 0.1 L/kg, complete contact may be difficult so that the alkali distribution in the alkali cellulose may become uneven, causing deterioration in the quality of the product. The upper limit of the ratio of the volume of the alkali metal hydroxide solution to the weight of the pulp is determined depending on the filtration capacity of vacuum filtration, but the ratio of up to 100 L/kg is typically preferred.

In the invention, the liquid quantity is preferably maintained at such a liquid quantity that the contact product remaining on the filtration plane is prevented from moving at a speed different from the moving speed of the filtration plane. It is therefore preferable to adjust the spraying speed of the alkali metal hydroxide solution or the filtration speed.

In the invention, it is possible to mix the pulp with the alkali metal hydroxide solution prior to introduction of the pulp onto the moving filtration plane. When they are mixed in advance, the advanced contact time between the pulp and the alkali metal hydroxide solution is preferably regulated since they have already been brought into contact with each other.

Some of the alkali metal hydroxide solution thus sprayed is absorbed by the pulp, some adheres to the surface of the pulp, and the remnant is suctioned and removed from the filtration plane. It is suctioned to such an extent that the alkali metal hydroxide solution may be discharged so as to prevent the contact product from being fluidized with the alkali metal hydroxide solution retained on the filtration plane. Fluidization of the contact product is not preferable because it causes variations in retention time in the continuous horizontal vacuum filter type contactor.

Vacuum filtration may be performed by a vacuum pan 17 and a vacuum pump 18 located on the back side of the filtration plane. The alkali metal hydroxide solution collected by vacuum filtration may be sent to a metal oxide solution tank 30. The contact product of the alkali metal hydroxide solution and the pulp may be collected from the outlet 14. In order to heighten the fluidity and facilitate transfer to the subsequent step, the alkali metal hydroxide solution 2 can be supplied from a supply port (or a supply nozzle is usable instead) 15.

A scraper 16 may be provided to facilitate the step of collecting the contact product from the filtration plane. The contact product thus collected is separated by the drainer 20 into alkali cellulose 3 in cake form. The liquid recovered by the drainer is sent to the alkali metal oxide solution tank 30 and is then sent to the continuous horizontal vacuum filter type contactor 10 by pump 31 for recycle. At this time, use of a heat exchanger 32 can facilitate temperature adjustment of the alkali metal hydroxide solution. To prevent clogging of the filtration plane, water, hot water, steam, air, inert gas, or an alkali metal hydroxide solution is continuously or intermittently sprayed to the filtration plane from a washing nozzle 19 to wash off the attached matters. For this purpose, a fresh alkali metal hydroxide solution is preferred. The alkali metal hydroxide solution thus sprayed is collected after passing through the filtration material and can be used again as the alkali metal hydroxide solution 2.

The pore size of the filtering material is not limited insofar as it prevents passage of the pulp. It is preferably 5 mm or less, more preferably from 0.1 to 5 mm. A mesh belt, a perforated metal belt, or filtering cloth made of, for example, polyester, polypropylene, or nylon can be used. Of these filtering materials, a perforated metal belt is preferred. As the perforated metal belt, a metal belt with any of round, triangle, or rectangular pores may be employed, but a belt with round pores is preferred. The thickness of the filtering material is preferably 5 mm or less, more preferably from 0.1 mm to 2 mm.

The amount of the pulp per filtration area is preferably 50 $kg/m^2$ or less, more preferably 10 $kg/m^2$ or less. The pulp amounts exceeding the above range may make uniform contact difficult. On the other hand, the lower limit is preferably 0.5 $kg/m^2$.

In the invention, a lower alcohol (preferably, an alcohol having from 1 to 4 carbon atoms) or the other inert solvent may be also used. Use of such a solvent makes it possible to improve the uniformity of the distribution of the alkali and in addition provide alkali cellulose with an improved bulk density.

In the invention, after the pulp and the alkali metal hydroxide solution are brought into contact with each other, for example, in a continuous horizontal vacuum filter type contactor, the contact product thus obtained is drained by a drainer such as a squeezer for removing an extra alkali metal hydroxide solution so that the residue becomes the corresponding alkali cellulose.

The drainer may include a drainer making use of a centrifugal force such as a decanter or a rotating basket, a mechanical drainer such as a roll type, a V-shaped disc press, or a basket press, and a vacuum filter. From the viewpoint of uniform draining, a drainer making use of a centrifugal force is preferred. In addition, a drainer capable of continuous treatment is also preferred. Examples may include a screw discharge type centrifugal dehydrator, an extrusion plate type centrifugal separator, and a decanter. In a drainer making use of centrifugal force, a required draining degree can be attained by adjusting the rotation speed of the drainer. In a mechanical drainer and a vacuum filter, a required draining degree can be attained by adjusting a draining pressure and a degree of vacuum, respectively.

The alkali metal hydroxide solution recovered by draining can be recycled. For recycling, it is preferred to supply an alkali metal hydroxide solution to the system continuously in an amount equal to that of the alkali metal hydroxide solution taken out of the system as alkali cellulose. In this case, after the alkali solution recovered by draining is transferred to the tank once and then supplied from this tank to an apparatus for contact, a new alkali metal hydroxide solution can be added so as to keep a constant level in the tank.

When the alkali solution recovered by draining is recycled, it is particularly preferable to use both a continuous centrifugal separator having a perforated rotor and a continuous centrifugal separator having an imperforate rotor in combination. This makes it possible to prevent the clogging of the centrifugal separator having a perforated rotor and thereby prevent filtration failure or oscillation of the centrifugal separator caused by the filtration failure. The contact product of the pulp and the alkali metal hydroxide solution is separated into a liquid and a solid by using a continuous centrifugal separator having a perforated rotor. Then, a fine solid in the separated liquid is recovered using a continuous centrifugal separator having an imperforate rotor. All or part of the liquid separated by the continuous centrifugal separator having a perforated rotor can be directly introduced into the continuous centrifugal separator having an imperforate rotor. Alternatively, it can be once transferred to the tank and then introduced into the continuous centrifugal separator having an imperforate rotor. The solid recovered from the separated liquid by using the continuous centrifugal separator having an imperforate rotor can be used as alkali cellulose.

The continuous centrifugal separator can control the number of rotation which means a centrifugal effect, depending on the contact time and the contact temperature between pulp and an alkali metal hydroxide solution, and necessary draining degree. By controlling the centrifugal effect, the concentration of the alkali metal hydroxide solution fed repeatedly for the contact with the pulp can be kept constant and as a result, cellulose ether having high transparency can be obtained. When an increase in the contact time and/or the contact temperature is intended under the present operation conditions, the centrifugal effect can be reduced. When a decrease in the contact time and/or contact temperature is intended, the centrifugal effect can be increased. The variations in the concentration of the alkali metal hydroxide solution are reduced to preferably within ±10%, more preferably within ±5%.

As described in "New Edition Chemical Engineering Dictionary Edited by Society for Chemical Engineers, Japan", published on May 30, 1974, the centrifugal effect is a value indicating a magnitude of the centrifugal force and is given by a ratio of centrifugal force to gravity. The centrifugal effect Z is represented by the following equation:

$$Z=(\omega^2 r)/g=V^2/(gr)=\pi^2 N^2 r/(900\ g)$$

wherein "r" represents a rotation radius (unit m) of a rotor, "ω" represents an angular velocity (unit rad/sec) of the rotor, "V" represents a peripheral speed (m/sec) of the rotor, "N" represents the number of revolutions (rpm) of the rotor and "g" represents acceleration of gravity ($m/sec^2$).

A weight ratio of the alkali metal hydroxide contained in the cake obtained in the draining step to the solid component in the pulp (alkali metal hydroxide/solid component in pulp) is preferably in a range of from 0.3 to 1.5, more preferably from 0.65 to 1.30, still more preferably from 0.90 to 1.30. When the weight ratio is from 0.3 to 1.5, the cellulose ether thus obtained may have high transparency. The solid component in the pulp may include, in addition to cellulose which is a main component, hemicellulose, lignin, organic matter such as resin, and inorganic matter such as Se and Fe components.

The weight ratio of (alkali metal hydroxide)/(solid component in pulp) can be determined by the following titration method when the alkali metal hydroxide is, for example, sodium hydroxide.

First, 4.00 g of a cake is collected and the amount (% by weight: wt %) of the alkali metal hydroxide contained in the cake is determined by neutralization titration (0.5 mol/L $H_2SO_4$, indicator: phenolphthalein). A blank test is also performed in the same manner.

$$\text{wt \% of alkali metal hydroxide} = (\text{normality factor}) \times \{(\text{dropped amount (ml) of } H_2SO_4) - (\text{dropped amount (ml) of } H_2SO_4 \text{ in blank test})\}$$

Using the wt % of the alkali metal hydroxide contained in the cake, (alkali metal hydroxide)/(solid components in pulp) is then determined in accordance with the following equation:

$$(\text{wt of alkali metal hydroxide})/(\text{wt of solid component in pulp}) = (\text{wt \% of alkali metal hydroxide})/[\{100 - (\text{wt \% of alkali metal hydroxide})/(B/100)\} \times (S/100)]$$

In the above equation, B represents the concentration (wt %) of the alkali metal hydroxide solution and "S" represents the concentration (wt %) of the solid component in the pulp. The concentration of the solid component in the pulp is obtained by dividing the dry weight after drying about 2 g of the pulp at 105° C. for 2 hours by the weight of the pulp and then expressing the quotient by wt %.

In the invention, by measuring a feed rate of the pulp and measuring a recovery rate of the drained alkali cellulose or a consumption rate of the alkali metal hydroxide solution, and calculating the composition of the alkali cellulose at present based on their weight ratios, it is possible to control the contact time, the temperature of the alkali metal hydroxide solution in the continuous horizontal vacuum filter, or a draining degree such as a squeezing pressure so as to conform the calculated composition to a target composition. The above-described measurements, calculation and controlling operations can be automated.

The composition of the alkali cellulose can be selected by the etherification degree of cellulose ether obtained from the alkali cellulose, that is, the degree of substitution of the alkali cellulose.

Using the alkali cellulose obtained by the above-described preparation method as a raw material, cellulose ether can be prepared in a known manner.

The reaction method may include a batch process and a continuous process. The continuous reaction process is preferable because a continuous process is preferably employed for preparation of the alkali cellulose in the invention, but the batch process is also usable.

In the batch process, the alkali cellulose discharged from the drainer may be stored in a buffer tank, or placed directly in an etherification reactor. It is preferable from the standpoint of higher productivity to store the alkali cellulose in the buffer tank and then place it in a reaction vessel within a short time, thereby reducing the occupancy time in the etherification reactor. For suppressing decrease in the degree of polymerization, the buffer tank preferably has an oxygen-free atmosphere by vacuum or nitrogen replacement.

Examples of cellulose ether obtainable from the resulting alkali cellulose as a starting material include alkyl cellulose, hydroxyalkyl cellulose, hydroxyalkylalkyl cellulose and carboxymethyl cellulose.

Examples of the alkyl cellulose include methyl cellulose having a methoxy group (DS) of from 1.0 to 2.2 and ethyl cellulose having an ethoxy group (DS) of from 2.0 to 2.6. It should be noted that DS represents the degree of substitution and means the average number of hydroxyl groups replaced by a methoxy group per glucose ring unit of cellulose, while MS represents molar substitution and means the average mole of hydroxypropoxy group or hydroxyethoxy group added per glucose ring unit of cellulose.

Examples of the hydroxyalkyl cellulose may include hydroxyethyl cellulose having a hydroxyethoxy group (MS) of from 0.05 to 3.0 and hydroxypropyl cellulose having a hydroxypropoxy group (MS) of from 0.05 to 3.3.

Examples of the hydroxyalkylalkyl cellulose may include hydroxyethylmethyl cellulose having a methoxy group (DS) of from 1.0 to 2.2 and a hydroxyethoxy group (MS) of from 0.1 to 0.6, hydroxypropylmethyl cellulose having a methoxy group (DS) of from 1.0 to 2.2 and a hydroxypropoxy group (MS) of from 0.1 to 0.6, and hydroxyethylethyl cellulose having an ethoxy group (DS) of from 1.0 to 2.2 and a hydroxyethoxy group (MS) of from 0.1 to 0.6.

Examples further include carboxymethyl cellulose having a carboxymethoxy group (DS) of from 02 to 2.0.

Examples of the etherifying agent may include alkyl halides such as methyl chloride and ethyl chloride; alkylene oxides such as ethylene oxide and propylene oxide; and monochloroacetic acid.

EXAMPLES

The present invention will be described by Examples. It should not be construed that the invention is limited to or by these Examples.

Example 1

Pulp chips derived from wood and having a solid component concentration of 93% by weight, each of the chips being of 10 mm square, were introduced at a rate of 60 kg/hour to one end of a horizontal belt type vacuum filter of 0.2 m wide and 1.0 m long. As a filtering material, a perforated metal belt having a thickness of 1 mm and holes with a diameter of 2 mm was used. The moving speed of the belt was 0.025 m/s. Spraying nozzles were provided at 0 m, 0.2 m, 0.4 in, 0.6 m and 0.8 m in the moving direction and 2 cm, 6 cm, 10 cm, 14 cm and 18 cm from one end on a straight line in the width direction. An aqueous 49% by weight sodium hydroxide solution of 40° C. was sprayed at a spraying rate of 120 L/hour per nozzle. At the same time, the aqueous 49% by weight sodium hydroxide solution which had passed through a cake layer was suctioned from a filtration plane. Screw type leveling devices, each having a function of controlling a height level and gathering a contact product between the pulp and the alkali metal hydroxide solution from both ends to the middle, were installed at positions of 0.2 m and 0.4 m in a moving direction. The leveling devices allowed a uniform deposition height of 100 mm. The contact product between the pulp and the alkali metal hydroxide solution was mixed by using the leveling device.

An aqueous 49% by weight sodium hydroxide solution of 40° C. was supplied at 2 m$^3$/hour to the outlet of the continuous horizontal vacuum filter to fluidize the contact product. A mixture of the pulp chips and the aqueous sodium hydroxide solution discharged from the continuous horizontal vacuum filter was drained continuously by a V-shaped disk press serving as a drainer. After the discharge of the contact product between the pulp and the alkali metal hydroxide solution, the metal belt was washed with an aqueous 49% by weight sodium hydroxide solution of 40° C. from the back side thereof. A weight ratio of the alkali metal hydroxide in the resulting alkali cellulose to the solid component in the pulp was determined by the titration method. It was 1.25.

The alkali cellulose (20 kg) was placed in a pressure-resistant reactor and after vacuuming, it was reacted with 11 kg of methyl chloride and 2.7 kg of propylene oxide. The reaction product was washed, dried and pulverized to obtain hydroxypropylmethyl cellulose. The resulting hydroxypropylmethyl cellulose had a methoxy group (DS) of 1.90 and a hydroxypropoxy group (MS) of 024. An aqueous 2% by weight solution of the hydroxypropylmethyl cellulose had a viscosity of 10,000 mPa/s at 20° C. The light transmittance of the aqueous 2% by weight solution of the hydroxypropylmethyl cellulose at 20° C. was 99.0% as measured with a PC-50 type photoelectric calorimeter using a cell length of 20 mm and wavelength of 720 nm.

Example 2

Alkali cellulose was prepared in the same manner as in Example 1 except that the moving speed of the belt was 0.033 m/sec, a Wade type leveling device was used instead, and a screw discharge type centrifugal dehydrator having a centrifugal effect of 600 as a drainer was placed at the outlet of the continuous horizontal vacuum filter.

A weight ratio of the alkali metal hydroxide in the resulting alkali cellulose to the solid component in the pulp was determined by the titration method and found to be 1.00.

The alkali cellulose (17.2 kg) was placed in a pressure-resistant reactor and after vacuuming, it was reacted with 9 kg of methyl chloride and 1.4 kg of propylene oxide. The reaction product was washed, dried and pulverized to obtain hydroxypropylmethyl cellulose.

The hydroxypropylmethyl cellulose thus obtained had a methoxy group (DS) of 1.80 and a hydroxypropoxy group (MS) of 0.14. An aqueous 2% by weight solution of the hydroxypropylmethyl cellulose had a viscosity of 9,800 mPa/s at 20° C. The light transmittance of the aqueous 2% by weight solution of the hydroxypropylmethyl cellulose at 20° C. was 97.5% as measured with a PC-50 type photoelectric calorimeter using a cell length of 20 mm and wavelength of 720 nm.

Example 3

Alkali cellulose was prepared in the same manner as in Example 1 except that spraying from the spraying nozzles at 0 m, 0.2 In, and 0.4 m in the moving direction was omitted and an extrusion plate type centrifugal dehydrator with a 0.2 mm slit screen having a centrifugal effect of 600 as a drainer was placed at the outlet of the continuous horizontal vacuum filter.

A weight ratio of the alkali metal hydroxide in the resulting alkali cellulose to the solid components in the pulp was determined by the titration method and found to be 0.70.

The alkali cellulose (18.8 kg) was placed in a pressure-resistant reactor and after vacuuming, it was reacted with 9 kg of methyl chloride and 2.5 kg of propylene oxide. The reaction product was washed, dried and pulverized to obtain hydroxypropylmethyl cellulose. The resulting hydroxypropylmethyl cellulose had a methoxy group (DS) of 1.45 and a hydroxypropoxy group (MS) of 0.20. An aqueous 2% by weight solution of the hydroxypropylmethyl cellulose had a viscosity of 9,800 mPa/s at 20° C. The light transmittance of the aqueous 2% by weight solution of the hydroxypropylmethyl cellulose at 20° C. was 97.0% as measured with a PC-50 type photoelectric calorimeter using a cell length of 20 mm and wavelength of 720 nm.

Example 4

Alkali cellulose was prepared in the same manner as in Example 1 except that the moving speed of the belt was changed to 0.033 m/sec, spraying from the spraying nozzles at positions 0 m, 0.2 in, and 0.4 m in the moving direction was omitted, and an extrusion plate type centrifugal dehydrator with a 0.2 mm slit screen having a centrifugal effect of 600 as a drainer was placed at the outlet of the continuous horizontal vacuum filter.

A weight ratio of the alkali metal hydroxide in the resulting alkali cellulose to the solid components in the pulp was determined by the titration method and found to be 0.50.

The alkali cellulose (18.8 kg) was placed in a pressure-resistant reactor and after vacuuming, it was reacted with 9 kg of methyl chloride and 2.5 kg of propylene oxide. The reaction product was washed, dried and pulverized to obtain hydroxypropylmethyl cellulose. The resulting hydroxypropylmethyl cellulose had a methoxy group (DS) of 1.35 and a hydroxypropoxy group (MS) of 0.25. An aqueous 2% by weight solution of the hydroxypropylmethyl cellulose had a viscosity of 9,800 mPa/s at 20° C. The light transmittance of the aqueous 2% by weight solution of the hydroxypropylm-ethyl cellulose at 20° C. was 96.0% as measured with a PC-50 type photoelectric calorimeter using a cell length of 20 mm and wavelength of 720 nm.

The invention claimed is:

1. A method for preparing alkali cellulose, comprising:
   a) introducing a pulp onto a moving filtration plane;
   b) a contact filtration step comprising
      bringing the pulp into contact with an alkali metal hydroxide solution on a moving filtration plane for vacuum filtration,
      filtering the alkali metal hydroxide solution through the moving filtration plane by vacuuming a back side of the moving filtration plane to collect a contact product remaining on the moving filtration plane,
      adjusting a height level of the pulp using two or more screw-type or blade-type leveling devices placed along a path of the moving filtration plane, and
      gathering the pulp towards a middle of the moving filtration plane from both sides of the moving filtration plane with the two or more screw-type or blade-type leveling devices;
   c) a draining step comprising draining the collected contact product to obtain a cake,
   wherein bringing the pulp into contact with the alkali metal hydroxide solution comprises spraying the alkali metal hydroxide solution from two or more spray ports placed along the path of the moving filtration plane, wherein adjusting and gathering is performed prior to or after bringing the pulp into contact with the alkali metal hydroxide solution, and
   wherein the screw-type or blade type leveling device adjusts the height level to 100 mm or less.

2. The method for preparing alkali cellulose according to claim 1, wherein a weight ratio of alkali metal hydroxide contained in the cake to a solid component in the pulp is adjusted by changing a moving speed of the filtration plane or a contact distance of the pulp and the alkali metal hydroxide solution.

3. The method for preparing alkali cellulose according to claim 1, wherein a weight ratio of alkali metal hydroxide contained in the cake to a solid component in the pulp is in a range of from 0.3 to 1.5.

4. A method for preparing cellulose ether, comprising a step of reacting the alkali cellulose prepared by the method according to claim 1 with an etherification agent.

5. The method for preparing alkali cellulose according to claim 1, wherein each of the screw-type leveling device comprises a bilaterally symmetrical screw having a plane of symmetry at the middle.

6. The method for preparing alkali cellulose according to claim 1, wherein each of the blade-type leveling devices comprises two blades which keep a middle part of a width of the filtration plane open, each blade having an angle exceeding 0° but less than 90° when the angle of the moving direction is regarded as 0° and the angle of a width direction of the filtration plane is regarded as 90°.

7. The method for preparing alkali cellulose according to claim 1, wherein one of the screw-type or blade-type leveling devices is placed after introduction of the pulp onto the moving filtration plane but before the contact with the sprayed alkali metal hydroxide for adjusting the height level of the pulp introduced onto the moving filtration plane and for gathering the pulp introduced onto the moving filtration plane into the middle of both sides of the filtration plane.

8. An apparatus for preparing alkali cellulose, comprising:
   a continuous horizontal vacuum filter type contactor comprising:

a horizontal filtration plane moving in a horizontal direction for vacuum filtration through the filtration plane by vacuuming a back side of the filtration plane, a pulp inlet for introducing pulp onto the moving filtration plane, two or more spray ports placed along a path of the filtration plane configured to spray an alkali metal hydroxide solution to the pulp thus introduced, two or more screw-type or blade-type leveling devices placed along the path of the filtration plane wherein the two or more screw-type or blade-type leveling devices are configured to adjust a height level of the pulp introduced onto the filtration plane or the pulp brought into contact with the alkali metal hydroxide solution and to gather the pulp introduced onto the filtration plane or the pulp brought into contact with the alkali metal hydroxide solution to a middle from both sides of the filtration plane, a vacuum pump enabling vacuum suction of the back side of the moving filtration plane, an outlet for collecting a contact product remaining on the filtration plane after bringing the pulp into contact with the alkali metal hydroxide solution on the moving filtration plane for vacuum filtration, and a drainer for draining the contact product collected from the outlet to obtain a cake, and wherein the screw-type or blade type leveling device adjusts the height level to 100 mm or less.

9. The apparatus for preparing alkali cellulose according to claim 8, wherein each of the screw-type leveling devices comprises a bilaterally symmetrical screw having a plane of symmetry at the middle.

10. The apparatus for preparing alkali cellulose according to claim 8, wherein each of the blade type leveling devices comprises two blades which keep a middle part of a width of the filtration plane open, each blade having an angle exceeding 0° but less than 90° when the angle of the moving direction is regarded as 0° and the angle of a width direction of the filtration plane is regarded as 90°.

11. The apparatus for preparing alkali cellulose according to claim 8, wherein one of the screw-type or blade-type leveling devices is placed between the pulp inlet and the most upstream spray port of the two or more spray ports in the moving direction for adjusting the height level of the pulp introduced onto the moving filtration plane and for gathering the pulp introduced onto the moving filtration plane into the middle of both sides of the filtration plane.

* * * * *